Figure 1:
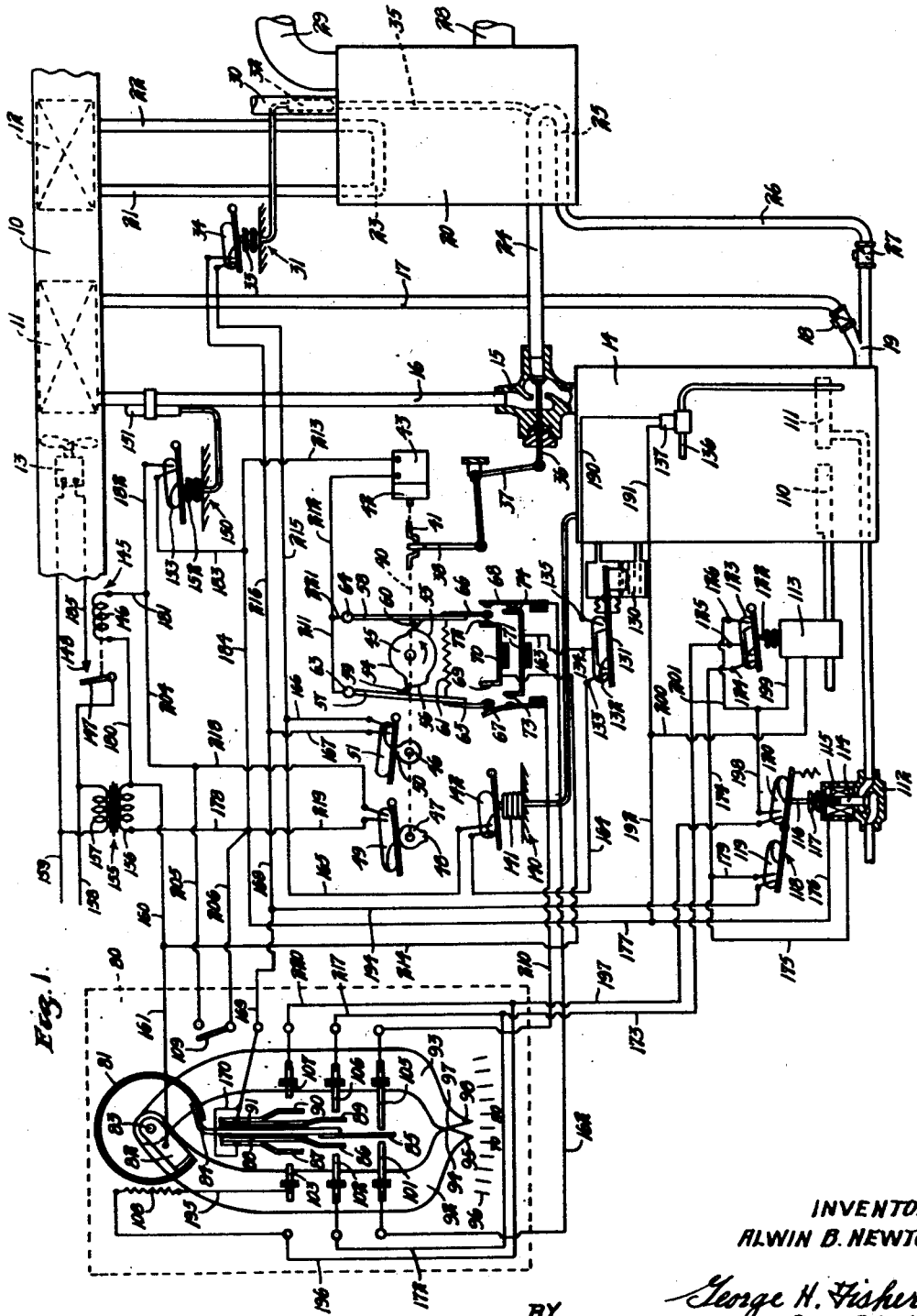

July 17, 1951  A. B. NEWTON  2,561,067
MULTIPLE STAGE AIR CONDITIONING SYSTEM
Filed Aug. 17, 1945  2 Sheets-Sheet 1

INVENTOR
ALWIN B. NEWTON

George H. Fisher
BY  ATTORNEY

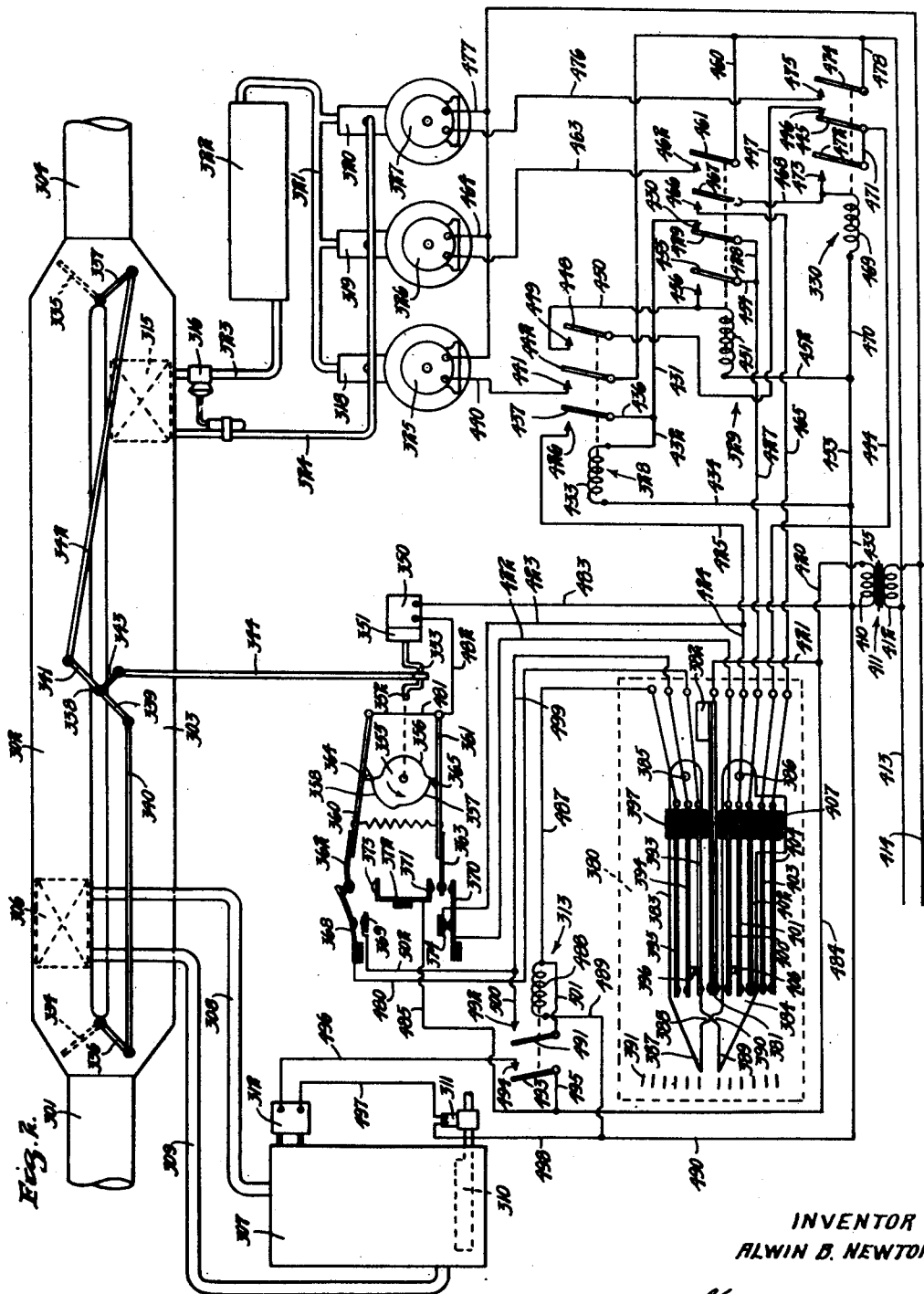

Patented July 17, 1951

2,561,067

UNITED STATES PATENT OFFICE 2,561,067

MULTIPLE STAGE AIR-CONDITIONING SYSTEM

Alwin B. Newton, Dayton, Ohio, assignor to Minneapolis-Honeywell Regulator Company, Minneapolis, Minn., a corporation of Delaware Application August 17, 1945, Serial No. 611,133

12 Claims. (Cl. 257—3)

The present invention is directed to the control of apparatus for heating and cooling enclosed spaces.

The conditioning of air for enclosures by either heating or cooling is old and well known. However, the use in residences of air conditioning apparatus incorporating both heating and cooling equipment is not as common as might be expected. When both heating and cooling equipment has been provided, it has been usual to provide a separate control system for each, with suitable means, such as a manually operated switch or an extra thermostat, for determining whether the heating or cooling equipment will be used. Not only has this sort of control been costly and demanding of more attention than desirable, but it has also resulted in improper control under some circumstances. For instance, if the control point for the heating be set too close to the control point for cooling, intermittent, and in some instances, simultaneous, heating and cooling may take place.

The present invention is directed to a relatively simple and fool-proof control apparatus for air conditioning equipment such as described. It is therefore a principal object to provide relatively simple and effective control apparatus for control of both heating and cooling equipment of an air conditioning system.

It is a further object to provide control apparatus which may be used, with only minor modifications, for various combinations of heating and cooling equipment such as independent heating and cooling equipment, steam or hot water heating equipment and absorption cooling means having a common boiler, reverse cycle systems, and other combinations of similar nature.

It is an additional object to provide control apparatus which is not only flexible in its adaptation to various installations, but also to provide apparatus which permits plural stage control of the conditioning equipment or which may provide plural stage operation of one sort and single stage operation of another sort.

It is also an object to provide control apparatus for plural stage control of temperature changing equipment wherein a desired sequence of operation of the stages is assured at all times.

It is a further object of this invention to provide control apparatus which includes suitable limit and safety controls and means for regulating accessory equipment, such as fans, pumps, and the like.

It is an additional object to provide control equipment including a single thermostat for controlling both heating and cooling equipment and wherein means are provided insuring a predetermined minimum differential between the heating and cooling control points.

It is an additional object to provide control apparatus for both heating and cooling equipment wherein the operating differentials on both the heating and cooling cycles may be individually adjusted.

It is another object to provide control apparatus for temperature changing equipment including a unidirectional motor for varying flow control means and for adjusting switch means and wherein said switch means forms part of a holding circuit for said apparatus.

It is also an object of this invention to provide automatic control apparatus which is inherently safe and dependable and requires a minimum of manual attention.

It is a further object to provide control apparatus for temperature changing equipment in which a plural stage thermostat selects the temperature changing equipment to be used with its first stage and causes operation of said equipment with its second stage.

It is another object to provide a control device for both heating and cooling control wherein plural stage operation is provided for either heating or cooling and where the control points for heating and cooling are individually adjustable subject to a predetermined minimum differential.

It is an object to provide a thermostat having a movable switch member carrying a plurality of switch blades electrically insulated from each other.

These and other objects will become apparent upon a study of the following specification and drawings wherein:

Figure 1 schematically shows the present control apparatus applied to an air conditioning system having a boiler common to both the heating and the cooling equipment.

Figure 2 schematically shows a slightly modified control apparatus applied to an air conditioning system using conventional heating and cooling equipment.

In Figure 1, the present air conditioning apparatus includes duct 10 through which the air being treated is circulated. A heat exchanger 11 is located within duct 10 for heating the air, heat exchanger 12 is provided for cooling the air, and motor driven fan 13 circulates the air. Heat exchanger 11 receives steam from boiler 14 through three-way valve 15 and pipe 16, condensate being returned through pipe 17, check valve 18 and pipe 19 back to the boiler. Boiler 14 is conventional in nature and is capable of giving two stages of heat, in a manner to be later described.

Heat exchanger 12 may be the evaporator of a suitable refrigerating system, but for the purpose of this description, it may be considered as merely a heat exchanger through which cooled brine is circulated, the brine being cooled by refrigerating apparatus 20. The brine is supplied through pipe 21, returned through pipe 22, and cooled in pipe coil 23, said pipe coil being in heat exchange relation with the evaporator of the refrigerating means 20. If desired, circulating means, not shown, may be provided for the brine circuit.

Refrigerating apparatus 20 is of the absorption type but obviously may utilize the jet principle or comprise any other known type of heat actuated refrigerating means. As the refrigerating apparatus per se forms no part of the present invention, and such apparatus is well known, further description seems unwarranted. Refrigerator 20 is supplied steam from boiler 14 through three-way valve 15 and pipe 24 to pipe coil 25 and condensate is returned through pipe 26, check valve 27, and pipe 19 to the boiler. Conduits 28 and 29 are used for circulation of a cooling fluid, such as air or water, for carrying away heat from the absorber and condenser of the refrigerating apparatus. A vent pipe 30 may be connected by pipe to the heating coil 25 for limiting the pressure therein to atmospheric.

Temperature responsive device 31, responding to the presence of steam in said vent pipe 30, includes a bulb 32 disposed in said vent pipe, a connected bellows 33, and a mercury switch 34 actuated by said bellows in a manner to open its contacts on a temperature rise in said bulb indicating the presence of steam. Obviously, the precise form of this device will depend on the apparatus to which it is applied and, of course, it may respond to pressure instead of temperature if desired. Obviously, other safety switches or limit controls may be used with temperature responsive means 31 or instead of the same.

Three-way valve 15 includes a movable member 36 operated by a pivoted bell crank 37 which in turn is operated by a reciprocable connecting rod 38. In the position shown in Figure 1, with rod 38 in its lowermost position and member 36 at its extreme right of travel, steam is delivered from the boiler 14 through pipe 16, whereas if member 36 be moved to the extreme left of its travel by rod 38 being actuated to its uppermost position, steam would then be delivered from the boiler to pipe 24.

Connecting rod 38 is actuated by a shaft 40 having a crank portion 41, said shaft 40 being driven through reduction gearing 42 by electric motor 43. In addition to crank portion 41, shaft 40 has attached thereto cams 45, 46, and 47. Cam 47 includes a raised portion 48 and operates a pivoted mercury switch 49 in a manner to close its contacts when said raised portion 48 is up. Cam 46 is similar to cam 47 but has its raised portion 50 180 degrees displaced from portion 48 of cam 47. Cam 46 operates mercury switch 51 to close its contacts when portion 50 is up.

Cam 45 has a low portion 54 of substantially 180 degrees angular extent, an intermediate portion 55, and a high portion 56, and controls the positions of switch arms 57 and 58, having cam followers 59 and 60, respectively. Cam followers 59 and 60 are held in engagement with cam 45 by a tension spring 61 extending between the switch arms. Switch arms 57 and 58 are pivoted at 63 and 64 and are provided at their other ends with flexible switch blades 65 and 66, respectively. Blade 65 is adapted to engage stationary flexible switch blade 67 when cam follower 59 is on portion 56 of cam 45 and to engage stationary contact 69 of fixed member 70 when follower 59 is on cam portion 54, and lie between and in spaced relation to blades 67 and contact 69 when follower 59 is on cam portion 55. In a like manner, blade 66 is adapted to engage stationary flexible switch blade 68 when follower 60 is on portion 56 of cam 45, to engage stationary contact 72 of member 70 when follower 60 is on cam portion 54, and to lie between and in spaced relation to blade 68 and contact 72 when follower 60 is on cam portion 55. A fixed member 71 of channel shape and generally similar to member 70 extends between blades 67 and 68 and includes contact portions 73 and 74 normally engaging blades 67 and 68, respectively, and serving as a stop means limiting inner movement of said blades. However, when either switch arm 57 or 58 is moved outwardly due to the respective follower engaging high portion 56 of cam 45, then either blade 67 will be moved out of engagement with contact 73 or blade 68 will be moved out of engagement with contact 74, respectively. Members 70 and 71, blades 67 and 68 and switch arms 57 and 58 function in electrical circuits to be described.

Primary control over motor 43 and the switches controlled thereby is effected by a thermostat 80 responsive to the temperature of the air being treated. Thermostat 80 comprises a curved bimetal attached at one end by bracket 82 to stationary post 83. A depending arm 84 is attached to the other end of bimetal 81 and carries a flexible contact member or blade 85 at its lower end. Flexible contact blades 86 and 87 are arranged together on the left side of blade 84 and insulated therefrom by electrical insulation 88, while similar blades 89 and 90 are arranged on the right side of blade 84 and insulated therefrom by insulation 91. Coacting with the contact blades are a series of contacts carried by adjustable arms 92 and 93, each of said adjustable arms being pivoted on or near post 83. Arm 92 has an abutment portion 94 and an indicating portion 95 movable along scale 96, while arm 93 has an abutment portion 97 and an indicating portion 98 for movement along said scale. Arm 92 carries contacts 101, 102, and 103, engageable by blades 85, 86, and 87, respectively, each of said contacts being electrically insulated from said arm. Arm 93 carries contacts 105, 106, and 107 engageable by blades 85, 89, and 90, respectively, each of these contacts being insulated from arm 93. Preferably, each of these contacts is individually adjustable. Thermostat 80 also includes anticipating heater 108 and manual switch 109. Bimetal 81 moves arm 84 to the left on temperature fall and to the right on temperature rise, and contacts 101, 102, and 103, or contacts 105, 106, and 107 are engaged in sequence by their respective coacting blades upon a sufficient change in temperature in either direction. Engagement of abutment portions 94 and 97 is effective to provide a minimum differential of temperature between heating and cooling cycles, thus preventing a slight overshoot in temperature change by one cycle from causing operation of the other cycle. Obviously, this differential may be increased if desired and either of the arms 92 or 93 may be adjusted for any desired temperature within the range of the instrument, except that 98 and 95 are prevented from coming closer than a predetermined amount by 94 and 97.

As before noted, boiler 14 can provide two stages of heat, this being due to two separately controlled burners 110 and 111. Burners 110 and 111 are controlled by valves 112 and 113, respectively, which control the flow of fuel to said burners. Valves 112 and 113 are alike and the construction of 112 represents that of 113. Valve 112 is of a conventional type and includes a movable valve member 114 having an armature portion which can be attracted by electromagnet coil 115 when energized to permit flow through said valve. A member 116, attached to member 114, extends through bellows seal 117 to operate switch means 118. The switch means 118 includes mercury switches 119 and 120, the contacts of each being closed when member 116 rises, and opened when 116 is in a lowered position. Valve 113 is similar to 112, as before noted, and includes a mercury switch 123 actuated by member 122 of said valve. Switch means 123 includes contact 124, common contact 125, and contact 126, with a circuit closed through contacts 124 and 125 and opened between contacts 125 and 126 when member 122 is lowered, due to the valve being closed. The circuit is opened between contacts 124 and 125 and closed through contacts 125 and 126 when member 122 is raised.

Boiler 14 is equipped with the rather conventional safety devices such as a low water cut-out 130 which includes a float operated pivoted lever 131 carrying a mercury switch 132. Mercury switch 132 has a contact 133, a common contact 134, and a contact 135 located at the opposite end of the switch from contact 133. A suitably connected pipe 136 supplies make-up water to the boiler under control of solenoid valve 137, said solenoid valve being controlled by said low water cut-out in a manner to be described. Boiler 14 is also provided with a pressure actuated device 140 including expansible bellows 141 and mercury switch 142 and operates in a manner to open the contacts of mercury switch 142 when the pressure in the boiler increases above a predetermined value.

The energization of fan 13 is controlled by a relay 145 which comprises a winding 146, a movable switch arm 147, and a stationary contact 148. Energization of the relay may be controlled by temperature responsive means 150 including a bulb 151 charged with an expansible fluid and strapped to pipe 16 in heat exchange relation thereto. A bellows 152 is connected to said bulb and operates a mercury switch 153 in a manner to close its contacts when the temperature in said bulb 151 rises to a predetermined value. Relay 145 can also be controlled by mercury switch 49 or manual switch 109, as will be noted. Current for the present control apparatus is supplied by a transformer 155 having a secondary winding 156 and a primary winding 157. Primary winding 157 is energized from line wires 158 and 159.

While the present apparatus has been set forth rather specifically, it is noted that many substitutions and equivalents come to mind. For instance, instead of using heating and cooling equipment supplied energy from a common boiler, it is apparent that a reverse cycle refrigerating appartus may be used with bell crank 37 controlling means for diverting the flow of refrigerant through the refrigerating equipment or for controlling the flow of treated air and the cooling air for the equipment over the condenser and evaporator of the refrigerating apparatus, in a desired manner. Instead of using plural stages of heating for the boiler, plural stages of compressing equipment may be likewise controlled. Further, the present disclosure shows two stages of operation, but this is only illustrative. Any desired number of stages of operation can be used. As before noted, the present us of safety devices, limit switches, fan control means, and the like, are illustrative only and obviously may take other forms and respond to different conditions than those herein described. In addition, device 80 may be constructed to respond to conditions other than temperature or to a combination of such factors as humidity, air, motion, temperature, and radiations. To more fully describe the present invention, the following operation schedule will describe the function of the above described appartus.

*Operation*

With the present equipment in the position shown in Figure 1, the apparatus is all at rest and no part of the equipment is functioning. None of the blades of the thermostat are in contact with their respectve stationary contacts, hence there is no demand for air treatment. Arms 92 and 93 are adjusted for a minimum differential of, say 5 degrees, indicator portion 95 is adjusted for a temperature of 72 degrees, and indicator portion 98 is adjusted for a temperature of 77 degrees. Assuming that a 2 degree differential is to be maintained on the heating cycle, it may then be further assumed that blade 85 engages contact 101 at 73 degrees, blade 86 engages contact 102 at 72 degrees, and blade 87 engages contact 103 at 71 degrees. In a like manner, on the cooling cycle, contact 85 will engage contact 105 at 76 degrees, blade 89 will engage contact 106 at 77 degrees, and blade 90 will engage contact 107 at 78 degrees.

If the temperature in the room or space being treated should now fall to 73 degrees, and blade 85 contact 101, a circuit may be traced as follows: transformer secondary 156, wire 160, wire 161, bracket 82, bimetal 81, arm 84, contact blade 85, contact 101, wire 162, blade 68, contact 74, member 71, wire 163, contact 134 of switch 132, contact 133, wire 164, mercury switch 142, wire 165, wire 166, mercury switch 51, wire 167, wire 168, wire 169, blades 89 and 90, wire 170, and blades 86 and 87. This circuit, it is noted, does not return to the secondary of the transformer hence nothing is energized, and the equipment remains inactive. However, should the temperature continue to fall to 72 degrees, and blade 86 make contact with 102, the previously noted circuit is completed as follows: wire 170, blade 86, contact 102, wire 172, wire 173, contact 125 of switch 123, contact 124, wire 174, wire 175, electromagnet coil 115 of valve 112, wire 176, wire 177, wire 178, and transformer secondary 156. A complete circuit is thus made and electromagnet coil 115 is energized, thus opening valve 112 and permitting a flow of fuel therethrough and causing operation of burner 111. Because member 36 of valve 15 is in its extreme right position, steam generated in boiler 14 is delivered through pipe 16 to heat exchanger 11 and condensate formed in said heat exchanger is returned to the boiler through pipe 17, check valve 18 and pipe 19, as before described. When the steam flow is sufficiently estabilshed as to raise the temperature of bulb 151 to, for instance, 200 degrees, mercury switch 153 of device 150 is actuated to close its contacts. Closing of the contacts of device 150 energizes motor driven fan 13 as follows: secondary winding 156, wire 180, relay coil 146, wire 181, wire 182, mercury switch 153, wire 183, wire 184, wire 178, and secondary winding 156 of the transformer. Energizing of coil 146 of relay 145 pulls switch arm 147 into engagement with contact 148 and the fan motor is energized by the circuit: line wire 158, switch arm 147, contact 148, wire 185, fan 13, and line wire 159.

It is thus noted that a fall in temperature to 72 degrees energizes one stage of burner operation and circulating fan 13 is placed in operation when sufficient heat is supplied to heat exchanger 11 to prevent cold air from being circulated through the system. If by chance, upon energizing of the initial circuit of the system as above described, low water cut-out 130 would have indicated a low water level, and arm 131 would have been raised to tip mercury switch 132 so that contact would be made between contacts 134 and 135, solenoid valve 137 would then be energized to permit the addition of make-up water by the following circuit: secondary winding 156, wire 160, wire 161, bracket 82, bimetal 81, arm 84, blade 85, contact 101, wire 162, blade 68, contact 74, member 71, wire 153, contact 134, contact 135, wire 190, solenoid valve 137, wire 191, wire 192, wire 177, and wire 178 back to secondary winding 156. Energizing of solenoid valve 137 causes it to open and permits water to flow in through pipe 136 to furnish the water needed in the boiler. When sufficient water has been introduced into the boiler to raise the water level sufficiently to again tip arm 131 down and to make engagement between contacts 133 and 134 and to break engagement between contacts 134 and 135, the energizing circuit for the solenoid valve is broken and the water flow stopped. The circuit previously set forth for energizing the first stage of the boiler heat is then reestablished and the boiler can be energized in the manner previously related. It is noted that when the circuit was broken between contacts 133 and 134, due to low water, the energizing circuit for valve 112 was likewise broken, hence there could be no boiler operation. As device 140 is also in series in the same circuit as contacts 133 and 134, excessive pressure in the boiler will cause opening of the circuit in mercury switch 142 and thereby prevent operation of the boiler. Low water cut-out 130 and pressure responsive device 140 thus constitute safety devices for safeguarding the operation of the boiler.

With one stage of heat being supplied by boiler 14, let it be assumed that the temperature begins to rise. First, however, note that the opening of valve 112 resulted in tipping switch means 118 so that the contacts of mercury switches 119 and 120 were closed. When the temperature rises above 72 degrees and blade 86 separates from contact 102, valve 112 is held open by a circuit traced as follows: secondary winding 156, wire 160, wire 161, bracket 82, bimetal 81, arm 84, blade 85, contact 101, wire 162, blade 68, contact 74, member 71, wire 163, contact 134, contact 133, wire 164, switch 142, wire 165, wire 166, wire 167, wire 168, wire 194, switch 119, wire 179, wire 175, electromagnet coil 115, wire 176, wire 177, and wire 178 back to transformer secondary 156. It is thus noted that switch 119, upon its closure, permits a holding circuit to be established which is controlled by blade 85 and contact 101. Should the temperature continue to rise to and above 73 degrees so that blade 85 separates from 101, this holding circuit would be broken, electromagnet coil 115 would be deenergized, and valve 112 would then close. This would tip switch 118 so that the contacts of mercury switch 119 would again be opened.

Going back to the stage of operation of the boiler wherein one burner is operating and the temperature is still below 72 degrees, assume that the temperature continues to drop and reaches 71 degrees. At this point, blade 87 engages contact 103 and burner 110 is brought into operation. With a completed circuit from secondary winding 156 through to wire 170 due to the energizing of the first stage of operation, the second stage may be energized by the circuit starting with wire 170 as follows: wire 170, blade 87, contact 103, wire 195, anticipating heater 108, wire 196, wire 197, switch 120, wire 198, wire 199, solenoid valve 113, wire 200, wire 192, wire 177, and wire 178 back to transformer secondary 156. Energizing solenoid valve 113 causes it to open and to permit fuel to flow to burner 110, thus providing both stages of heat for boiler 14. In addition to opening valve 113, member 122 tips mercury switch 123 so that a circuit is made through contacts 125 and 126 and is broken between contacts 124 and 125.

With the room temperature below 71 degrees and both stages of heat being supplied, let it now be assumed that the temperature rises. A rise in temperature will be due to the high rate of heat output of the boiler and may take place with fair rapidity. To anticipate the rise of temperature, it is noted that anticipating heater 108 adjacent bimetal 81 is energized so long as blade 87 engages contact 103. With heater 108 energized, it emits some heat and tends to open the contacts of the thermostats sooner than they would otherwise open to thus prevent overshooting of the temperature due to the rapid rate of heating. Now, due to the combined effects of the rise in room temperature due to both stages of burner operation, and due to the effects of heater 108, blade 87 now breaks away from contact 103. Obviously, this deenergizes heater 108, hence its effect on the bimetal 81 rapidly diminishes. However, both burners continue in operation due to a holding circuit for valve 113 established through blade 86 as follows: starting with wire 170, blade 86, contact 102, wire 172, wire 173, contact 125, contact 126, wire 201, wire 199, solenoid valve 113, wire 200, wire 192, wire 177, wire 178, and transformer secondary winding 156. It is thus noted that blade 86 controls a holding circuit for the second stage of burner operation. If the temperature should now rise above 72 degrees, and blade 86 separates from contact 102, this holding circuit would be broken. Valve 113 would then be deenergized and closed and burner 110 would go out because of lack of fuel. If the temperature should continue to rise to 73 degrees or higher, so that blade 85 would separate from contact 101, the holding circuit for valve 112 would then open, as previously described, and this valve would also be deenergized, closed, and cause the stopping of burner 111.

It is thus noted that means are provided for giving plural stages of burner operation and for placing a fan in operation as soon as it was clear that the air would be sufficiently heated to prevent harmful drafts. In addition, the basic energizing circuit for the valves which control burner operation includes the safety devices associated with the boiler so that burner operation can take place only when conditions are favorable. It should also be noted that the first stage of burner operation, controlled by valve 112, cannot be initiated unless valve 113 is closed due to the first made circuit going through contacts 125 and 124 of switch 123. In addition, it is noted that the initial energization of valve 113 cannot take place until the contacts are closed in switch 120 due to the opening of valve 112. Because of the switch controlled interlocking means, the valves must open in their predetermined sequence, thus assuring proper operation. With the temperature now above 73 degrees, and no more heat being generated, steam flow through pipe 16 stops, the temperature at bulb 151 falls, bellows 152 collapses, and the circuit through switch 153 is opened. This deenergizes relay coil 143, hence arm 147 disengages contact 148 and motor driven fan 13 stops.

However, if it should be desired to operate the fan when neither heating nor cooling is provided, this can be done by closing manual switch 109. This energizes relay 145 as follows: secondary winding 156, wire 180, coil 146, wire 181, wire 204, wire 205, switch 109, wire 206, wire 178, and secondary winding 156. Energizing coil 145 places the fan in operation in the manner previously described. Means are thus provided for causing the circulation of air to the space being treated even though neither heating nor cooling is required.

If the temperature in the space should now rise to 76 degrees, blade 85 would then engage contacts 105. This will initiate operation of motor 43 in the following manner: secondary winding 156, wire 160, wire 161, bracket 82, bimetal 81, blade 84, blade 85, contact 105, wire 210, blade 67, blade 65, arm 57, wire 211, wire 212, motor 43, wire 213, wire 184, and wire 178, back to secondary winding 156. Energizing motor 43 causes it to start operating. Driving through reduction gearing 42, it rotates shaft 40 in a counterclockwise direction. The initial movement of cam 45, driven by shaft 40, causes follower 59 to fall off high portion 56 of said cam to low portion 54. This breaks the initial energizing circuit for the motor which went through blades 67 and 65. However, when follower 59 drops off high portion 56, blade 65 then engages contact 69 of member 70 and a holding circuit for motor 43 is established as follows: secondary winding 156, wire 160, wire 214, member 70, contact 69, blade 65, arm 57, wire 211, wire 212, motor 43, wire 213, wire 184, and wire 178 back to secondary winding 156. Motor 43 thus continues to operate. As cam 45 rotates, arm 58 remains in its present position until follower 60 rides up on high portion 56 at which time blade 66 then engages blade 68. However, with follower 59 still on low portion 54, and the holding circuit maintained through contact 69 and blade 65, the motor continues to operate. However, as cam 45 is rotated through about 180 degrees from its initial position, the beginning of intermediate portion 55 engages follower 59 and raises blade 65 off contact 69 and positions blade 65 between and in spaced relation to contact 69 and blade 67. This breaks the holding circuit and does not reestablish the initial circuit, and the motor stops. However, cam 45 has been rotated through 180 degrees as have cams 46 and 47. In addition, crank portion 41 is now located with its throw in an uppermost position, connecting rod 38 is in its uppermost position, and the movable member 36 of valve 15 is in its extreme left position. Valve 15 is now positioned to deliver steam through pipe 24 to refrigerating apparatus 20.

High portion 48 of cam 47 is now uppermost and the contacts of switch 49 are closed. The high portion of cam 46 is now in a lower position and the contacts of the switch 51 are open.

If the temperature in the space should now rise to 77 degrees, and blade 89 engages contact 106, the refrigerating apparatus 20 is placed in operation as follows: secondary winding 156, wire 160, wire 161, bracket 82, bimetal 81, blade 84, blade 85, contact 105, wire 210, blade 67, contact 73, member 71, wire 163, contact 134, contact 133, wire 164, switch 142, wire 165, wire 215, switch 34, wire 216, wire 168, wire 169, blade 89, contact 106, wire 217, wire 173, contact 125, contact 124, wire 174, wire 175, electromagnet coil 115 of valve 112, wire 176, wire 177, and wire 178 back to secondary winding 156. Valve 112 is thus energized and opened and burner 111 is placed in operation in the same manner as previously related in describing the heating cycle. Steam is generated in boiler 14 and delivered through pipe 24 to coil 25 within the heating apparatus 20 and condensate from said coil is returned through pipe 26, check valve 27, and pipe 19 to the boiler as previously described.

Supplying heat to an absorption refrigeration system causes cooling at the evaporator of the same in a manner well known and cools the brine in pipe coil 23. Brine is caused to circulate from coil 23 through pipe 21, heat exchanger 12 and pipe 22 by suitably arranging the refrigerating apparatus relative to the heat exchanger or by providing suitable circulating means (not shown). It is noted that the initial demand for cooling caused closing of the contacts of switch 49 and caused operation of motor driven fan 13 by energizing relay 145 by the following circuit: secondary winding 156, wire 180, relay coil 146, wire 181, wire 204, wire 218, switch 49, wire 219, wire 178 and secondary winding 156. The fan thus operates continuously while cooling is required.

With one stage of heat being supplied to the boiler for low stage operation of refrigerating apparatus 20, operation continues as just described until the temperature falls sufficiently to deenergize the apparatus, until the temperature rises sufficiently to require second stage operation of the boiler for a higher degree of operation of refrigerating apparatus 20, or until device 31 responds to steam in vent pipe 30.

In the event of steam exhausting through vent pipe 30 and raising the temperature of bulb 32 located therewithin, the higher temperature at bulb 32 expands bellows 33 and tips mercury switch 34 to open its contacts. It was noted that the energizing circuit for valve 112 went through switch 34, hence opening its contacts deenergizes valve 112 and causes it to close. Device 31 thus prevents operation of the boiler if the refrigerating apparatus is unable to handle the heat supplied to the same and also operates to maintain uniform temperatures in the heated portion of the refrigerating apparatus.

Should the temperature now rise to 78 degrees and require both stages of operation, blade 90 engages contact 107 and valve 113 is energized, starting with wire 169 as follows: wire 169, blade 90, contact 107, wire 220, wire 197, switch 128, wire 198, wire 199, valve 113, wire 200, wire 192, wire 177, and wire 178 back to secondary winding 156. With both stages of heat being supplied by boiler 14, and refrigerating equipment 20 operating at its maximum output, the temperature should fall in the space being treated. Assuming that it does fall below 78 degrees, and blade 90 separates from contact 107, valve 113 remains energized until blade 89 separates from contact 106, the holding circuit for the valve being the same as that described under the heating cycle excepting that the circuit is completed from wire 169 through blade 89 and wire 217 to wire 173 instead of from wire 169 through wire 170, blade 86, contact 102 and wire 172 to wire 173.

When blade 89 separates from contact 106 and breaks the holding circuit for 113, the valve closes and burner 110 stops. Operation then continues at the low stage until blade 85 separates from contact 105. The holding circuit for valve 112 is the same as that described under the heating cycle excepting that the current flows from blade 84 through blade 85, contact 105, wire 210, blade 67, and contact 73 to member 71 instead of from blade 85 through contact 101, wire 162, blade 68 and contact 74 to member 71, as described under the description of the heating cycle.

If, after contact 85 separates from 105, there is another demand for cooling, contact 85 will reengage contact 105 in the same manner as previously related. However, since the motor will have operated to a position so that blade 65 lies between blade 67 and contact 69, and blade 67 engages contact 73, there will be no further operation of the motor and the control of the burners will function as before. However, should the next demand on the apparatus be for heating, and blade 85 engage contact 101, the motor will be energized by the following circuit: transformer secondary 156, wire 160, wire 161, bracket 82, bimetal 81, arm 84, blade 85, contact 101, wire 162, blade 68, blade 66, arm 58, wire 221, wire 212, wire 213, wire 184, and wire 178 back to transformer secondary 156. The initial operation of the motor will operate cam 45 so that follower 60 will then drop off the high portion 56 of the cam onto low portion 54. This will bring blade 66 into contact with 72 and the holding circuit for motor 43 will then comprise: transformer secondary 156, wire 160, wire 214, member 70, contact 72, blade 66, arm 58, wire 221, wire 212, motor 43, wire 213, wire 184, and wire 178 back to said secondary winding 156. The motor will then continue operating until cam 45 has rotated 180 degrees from its previous position and follower 60 rides upon intermediate portion 55 of cam 45 to assume the position shown in Figure 1 of the drawing. At the same time, valve member 36 will be moved from the extreme left position to the position shown in the drawing. Then, engagement of blade 86 with contact 102 will bring on the first stage of heat in the manner previously related. Further, if the next demand should be for cooling, the motor would again be operated upon contact being made between 85 and contact 105 as previously related.

It is noted that the present control apparatus provides plural stage operation of means for supplying either heating or cooling for an air conditioning system without manual attention. The apparatus does not cycle between heating and cooling because the minimum differential selected is larger than the control differential of either the heating or the cooling cycle and the apparatus is readily adjusted to heat to any desired temperature and to cool to any desired temperature within the range of the equipment. In addition, both the heating and cooling equipment is operated only when safe to do so. In addition, by providing means for properly controlling plural stage operation of the heating plant, no more heat is supplied for heating than is needed nor is any more fuel burned for the cooling than is required. It is, of course, obvious that the values and the like used in the above description are illustrative only and are not to be considered in a limiting sense.

As mentioned in describing the present apparatus, many alternatives and substitutions come to mind. To better show the scope of the present invention and to give concrete form to some of the proposed alternatives, reference is made to Figure 2.

FIGURE 2

To show the flexibility of the present control apparatus, and to make more apparent the broad scope of the present invention, the present control apparatus is applied to an air conditioning system including conventional heating apparatus and plural stage refrigerating equipment. Air for the space being conditioned is delivered through duct 301, branch duct 302 or 303, and duct 304 by suitable circulating means (not shown). A heat exchanger 306 located in branch duct 302 is supplied with heated fluid from boiler 307 through supply pipe 308 and return pipe 309. Boiler 307 is of a conventional sort and comprises a burner 310 controlled by a solenoid valve 311. The energization of solenoid valve 311 is controlled by relay 313 having winding 488 and switch arms 491 and 493, engageable with contacts 492 and 494, respectively. Suitable safety equipment, such as a low water cut-out 312 may be provided for the boiler.

A refrigerator evaporator 315 is located in branch duct 303 and is supplied with refrigerant from a plural stage condensing unit under control of thermostatic expansion valve 316. Refrigerating compressors 318, 319, and 320 each discharge into pipe 321 which leads to condenser 322, said condenser delivering liquid refrigerant to thermostatic expansion valve 316 through pipe 323. The vaporized refrigerant from the evaporator is returned to the compressors through pipe 324. Compressors 318, 319, and 320 are driven by electric motors 325, 326, and 327, respectively.

The energization of the refrigerator compressor motors is controlled by suitable relay means which not only controls the operation of the motors but also their sequence of operation. Relays 328, 329, and 330 control directly the operation of motors 325, 326, and 327, respectively. In addition, interlocking circuits including these relays prevent energization of relay 328 unless relay 329 is deenergized; prevents energization of relay 329 unless relay 328 is energized and 330 is not energized, and prevents energization of relay 330 unless relay 329 is energized.

Relay 328 includes an operating coil 433 and movable switch arms 437, 442, and 448, engageable with contacts 426, 441, and 449, respectively, each of said contacts being engaged when coil 433 is energized. Relay 329 includes winding 451 and switch arms 455, 429, 467, and 461, engageable with contacts 456, 430, 466, and 462, respectively. Contact 430 is an "out" contact and engaged by arm 429 when relay 329 is deenergized; the other contacts are engaged by their respective arms when winding 451 is energized.

Relay 330 includes winding 469 and switch arms 472, 445, and 474, engageable with contacts 473, 446, and 475, respectively. Contact 446 is an "out" contact whereas the other contacts are engaged when the relay 330 is energized.

Whether air flows from duct 301 to duct 304 through duct 302 or 303 is determined by the operation of dampers 334 and 335 operated by lever means 336 and 337, respectively. A central pivoted lever device 338 includes a lever member 339, connected by link 340 to lever 336, and an oppositely disposed lever member 341 is connected by link 342 to lever 337. A third lever member 343 of said lever device is connected by connecting rod 344 to actuating means, to be described. Obviously, the air flow through duct 302 or 303 can be adequately controlled by damper 334 or 335 only, but the two dampers are preferred to improve flow conditions and to lessen noise from turbulence.

An electric motor 350 operating through reduction gearing 351 drives shaft 352 including a crank portion 353. In addition, shaft 352 has affixed thereon cam member 355 having a low portion 356 of substantially 180 degrees angular extent, an intermediate portion 357, and a high portion 358.

Cam 355 controls the position of pivoted switch arms 360 and 361 which carry switch blades 362 and 363, respectively. Arms 360 and 361 also include cam followers 364 and 365, respectively. When cam follower 364 is on high portion 358 of cam 355, blade 362 engages stationary and flexible switch blade 368 and forces it out of engagement with contact 369. With follower 365 on intermediate portion 357 of the cam, blade 363 is positioned between stationary switch blade 370 and contact 371 of member 372. In normal position, blade 370 engages contact 374 or blade 368 engages contact 369. When follower 364 drops off high portion 358 to low portion 356, blade 362 will then engage contact 373 of member 372. The movement of arms 360 and 361 and the switching provided thereby will be more fully described in the operation portion of this description.

The primary control means in the present apparatus is thermostat 380 which is located in a suitable place so that it can respond to the temperature of the air being treated. Thermostat 380 comprises a strip of bimetal 381 anchored to the base of the thermostat at 382. Thermostat 380 also includes pivoted arms 383 and 384, pivoted at 385 and 386, respectively. Blade 383 includes indicating portion 387 and abutment portion 388, whereas arm 384 includes indicating portion 389 and abutment portion 390. Indicating portions 387 and 389 coact with scale 391 for adjusting the instrument, while abutment portions 388 and 390 limit the minimum differential which can be established between the heating and the cooling operation of the system, as will be noted. In this thermostat, however, as in that of Figure 1, the differential may be made wider if desired and either arm 383 or 384 may be adjusted to any desired position, keeping in mind the minimum differential permitted. Arm 383 carries switch arms or blades 393, 394, and 395. Arms 393 and 394 are separated by metallic separating means 396. Each of the blades is insulated from each other at its anchor portion and from the arm 383 by insulating means 397. Arm 384 carries switch arms or blades 400, 401, 403, and 404 with insulation 407 insulating the blades from each other and from the arm. Arms 400 and 401 are separated by metallic spacer means 406.

The current for the present control apparatus is obtained from secondary winding 410 of transformer 411. Primary winding 412 of said transformer is connected to line wires 413 and 414.

While only a single stage of operation is shown for the heating plant, it is obvious that it could be controlled by plural stages if desired and the refrigerating equipment could be reduced to a single stage. These and other substitutions and alternatives are readily apparent and should be kept in mind when considering the present invention. The following operation schedule is intended to bring out the function of the present apparatus and to make the present description more clear.

*Operation*

With the apparatus in the position shown in Figure 2, it is noted that there is no demand for temperature change and the equipment is all inactive. Assuming that indicating portion 387 of arm 383 is set at 72 degrees and portion 389 of arm 384 is set at 77 degrees, as in the description of Figure 1, then it is noted that if the temperature drops to 73 degrees, bimetal 381 will contact arm 393. When the tempearture drops to 72 degrees, arm 394 will be forced into engagement with arm 395. When the temperature rises to 76 degrees, bimetal 381 will contact arm 400. At 77 degrees, arm 401 will be forced into engagement with arm 402; at 78 degrees, arm 402 will be forced into engagement with arm 403; and at 79 degrees, arm 403 will be forced into engagement with arm 404. While it was previously noted that the apparatus is inactive, it is noted that dampers 334 and 335 are adjusted to permit air flow through branch duct 303 past evaporator 315. Thus the equipment is in a position for providing cooling. Therefore, it is convenient to start the description of operation with a rising temperature in the space being treated.

With a temperature rise, to 76 degrees, bimetal 381 engages arm 400 as previously noted. The circuit connections made are as follows: secondary winding 410, wire 420, wire 421, bimetal 381, blade 400, wire 422, switch blade 370, contact 374, wire 423, wire 424, switch blade 401, and, in parallel with wire 424, wire 425 and contact 426 of relay 328. However, as blade 401 is connected by spacer 406 to blade 400, no circuit is completed here. Further, contact 426 of relay 328 is not engaged. On a further temperature rise to 77 degrees, blade 401 is forced into engagement with blade 402 and relay 328 is energized as follows: secondary winding 410, wire 420, wire 421, bimetal 381, blade 400, spacer 406, blade 401, blade 402, wire 427, wire 428, blade 429 and "out" contact 430 of relay 329, wire 431, wire 432, coil 433 of relay 328, wire 434, and wire 435 back to the other terminal of secondary winding 410. Energizing coil 433 of relay 328 pulls in the relay and establishes a holding circuit from wire 431 through wire 436, arm 437, contact 426, wire 425, wire 424, switch blade 401, spacer 406, blade 400, bimetal 381, wire 421, and wire 420 to the secondary winding 410. In addition, motor 325 of compressor 318 is started by the circuit: line wire 414, motor 325, wire 440, contact 441, switch arm 442, and line wire 413. The first stage of the compressing equipment is thus put into action and cooling is provided at evaporator 315.

Should the temperature in the space being conditioned fall, operation of the motor 325 would continue until bimetal 381 moved away from arm 400 and broke the holding circuit previously described. However, assume that the temperature continues to rise to 78 degrees. Arm 402 is now forced into engagement with arm 403 and relay 329 is energized to start motor 326. The circuit is as follows: secondary winding 410, wire 420, wire 421, bimetal 381, blade 400, spacer 406, blade 401, blade 402, blade 403, wire 444, blade 445, and "out" contact 446 of relay 330, wire 447, blade 448 and "in" contact 449 of relay 328, wire 450, winding 451 of relay 329, wire 452, wire 453, and wire 435 back to secondary winding 410. Energizing the relay coil 451 of relay 329 establishes a holding circuit from blade 402 of thermostat 80, wire 427, wire 454, arm 455, contact 456, coil 451, wire 452, wire 453, and transformer secondary 410, this holding circuit remaining in operation until arm 401 moves out of engagement with arm 402. Energizing relay 329 starts motor 326 by the circuit: line wire 413, wire 460, switch arm 461, contact 462, wire 463, motor 326, wire 464, and line wire 414.

Should the temperature rise to 79 degrees, and arm 403 be forced against 404 of the thermostat, the third stage of the refrigerating equipment will be placed in operation. The energizing circuit for relay 330 which controls motor 327 is as follows: secondary winding 410, wire 420, wire 421, bimetal 381, blade 400, spacer 406, blade 401, blade 402, blade 403, blade 404, wire 465, contact 466, arm 467, wire 468, coil 469, wire 470, wire 453, wire 435, and secondary winding 410. Energizing coil 469 of relay 330 pulls in its switch blades and establishes a holding circuit from thermostat blade 402, blade 403, wire 444, wire 471, arm 472, contact 473, coil 469, wire 470, wire 453, and 435 to secondary winding 410. This holding circuit is controlled by the engagement of blade 403 with 402 and remains in operation until blade 402 moves out of engagement with blade 403. In addition, motor 327 is started by the circuit: line wire 413, wire 478, arm 474, contact 475, wire 476, motor 327, wire 477, and line wire 414.

With all three of the compressors operating, the temperature should begin to fall and the compressors will be cut out of action in reverse sequence to which they were energized. In checking the energizing circuits for relays 328, 329, and 330, it will be noted that if all of the compressors are in operation and something should happen which would cause, for instance, relay 328 to be deenergized and stop motor 325, relay winding 433 of relay 328 cannot be reenergized because the holding circuit controlled by arm 431 and contact 436 is broken, and the initial energizing circuit from wire 428 through arm 429 and contact 430 is broken due to relay 329 being energized. Likewise, with relay 329 deenergized, it cannot be reenergized unless 328 is energized and relay 330 is deenergized, and relay 330 cannot be reenergized unless relay 329 is energized, as previously recited. Thus, by the present interlocking circuits, relays 328, 329, and 330, and the compressors which they control must always be started and operated in their proper sequence.

While no protective equipment is shown for the refrigerating equipment, it is of course obvious that such may be used. Apparatus commonly used comprises means responsive to unduly high head pressure and means for responding to suction pressure for preventing very low suction pressure. Apparatus of this sort, and others, may be easily connected into the present control apparatus by connecting same in series in wire 435. Thus, the occurrence of unduly high head pressures would stop all of the compressors, as would very low suction pressure. Of course, if it be desired to provide protective equipment or the like in controlling relation to any one of the compressors, this can easily be done by connecting same in series with the relay winding for that individual compressor.

Should the temperature in the space being conditioned now drop to 73 degrees due to seasonal change or the like, and bimetal 381 move into engagement with arm 393, motor 350 is energized as follows: transformer secondary winding 410, wire 420, wire 421, bimetal 381, blade 393, wire 480, switch blade 368, switch blade 362, arm 360, wire 481, wire 482, motor 350, wire 483, and secondary winding 410. Motor 350, operating through reduction gearing 351, rotates cam 355 in a counterclockwise direction. The initial movement of cam 355 causes follower 364 to drop off high portion 358 on to low portion 356. This permits blade 362 to engage contact 373 of member 372 and establish a holding circuit from secondary winding 410 through wire 420, wire 484, wire 485, member 372, contact 373, blade 362, arm 360, wire 481, wire 482, motor 350, and wire 483 back to secondary winding 410. Motor 350 will then continue to operate until cam follower 364 is forced upwardly by the intermediate portion 357 of cam 355. This will raise contact 362 off contact 373 and break the holding circuit. In the new position, blade 362 will be between and spaced from contact 373 and switch blade 368. Blade 368 will then engage contact 369. Also, cam follower 365 will be on high portion 358, and therefore blade 363 will be in engagement with switch blade 370 and engagement will be broken between blade 370 and contact 374. In addition, since shaft 352 has rotated 180 degrees, connecting rod 344 is raised and rotates lever device 338 in a counterclockwise direction in a manner to move dampers 334 and 335 to a position stopping air flow through branch 303 and permitting air flow through duct branch 302. The apparatus is now in a position for supplying heat to the space being conditioned. If the temperature should now fall to 72 degrees and blade 394 be forced into engagement with blade 395, boiler 307 is started in operation by the following circuit: secondary winding 410, wire 420, wire 421, bimetal 381, blade 393, spacer 396, blade 394, blade 395, wire 487, winding 488 of relay 313, wire 489, and wire 490 back to secondary winding 410. Energizing the winding 488 of relay 313 pulls blade 491 into engagement with contact 492 to form a holding circuit, to be later traced. Also, blade 493 is pulled into engagement with contact 494 to open solenoid valve 311 by the following circuit: transformer secondary winding 410, wire 420, wire 484, wire 495, blade 493, contact 494, wire 496, safety control 312, wire 497, solenoid valve 311, wire 498, wire 490 and secondary winding 410. Energizing solenoid valve 311 causes it to open and permit fuel to flow to burner 310 thus placing boiler 307 in operation and providing heat for heat exchanger 306.

With boiler 307 in operation and heat being supplied to heat exchanger 306, the temperature in the space being conditioned may be considered to rise. When it rises above 72 degrees, and blade 394 moves out of engagement with 395, boiler 307 is continued in operation by a holding circuit traced as follows: secondary winding 410, wire 420, wire 421, bimetal 381, blade 393, spacer 396, blade 394, wire 499, wire 500, contact 492, blade 491, wire 501, winding 488, wire 489, and wire 490 back to secondary winding 410. Another holding circuit may be traced as follows: secondary winding 410, wire 420, wire 421, bimetal 381, blade 393, wire 480, blade 368, contact 369, wire 502, wire 500, contact 492, blade 491, wire 501, winding 488, wire 489, and wire 490 back to secondary winding 410. However, both of these holding circuits depend on bimetal 381 engaging blade 393 and when the temperature rises to 73 degrees, and bimetal 381 leaves blade 393, the holding circuits are broken, winding 488 is deenergized, blade 493 breaks its engagement with contact 494, solenoid valve 311 closes and the boiler is shut down.

In this description, as in the description of the apparatus of Figure 1, it has been shown how both heating and cooling equipment can be controlled from the same thermostat in a manner to provide a predetermined differential for the operation of each stage of heating or cooling and to provide automatic changeover from heating to cooling with simple and readily available equipment. While the present control apparatus is shown in its application to two of the most common examples of heating and cooling equipment, it is, as before noted, obvious upon inspection that the present control equipment is equally useful with other types of heating and cooling equipment, such as the reverse cycle systems and the like. Because of the wide range of equivalents and substitutions that may be made in the present disclosure, it is considered that the scope of the present invention is to be limited only by the appended claims.

I claim as my invention:

1. In an air conditioning system including a condition changing means capable of plural stage operation, means for placing said changing means in operative or inoperative relation to said system, motor means for actuating said placing means, first switch means operated by said motor means, second switch means, said second switch means having a plurality of sequentially operable sets of contacts, condition responsive means for operating said second switch means, and circuit means connecting said motor means, said first switch means and said second switch means so that operation of the first set of contacts of said second switch means causes said motor means to position said placing means in a desired manner and operation of the second set of contacts of said second switch means energizes a circuit including said first switch means for causing operation of said changing means.

2. In air conditioning apparatus, temperature changing means including heating means and cooling means, flow diverting means for selectively placing either said heating means or said cooling means in operative relation to said apparatus, motor means for operating said diverting means, switch means operated by said motor means, said switch means including two sets of contacts, condition responsive means, second switch means operated by said condition responsive means, and circuit means connecting said heating means, said cooling means, said motor means, the first named switch means and said second switch means in such manner that said second switch means and one set of contacts of the first named switch means controls the operation of said motor means and said second switch means in cooperation with the other set of contacts of the first named switch means controls the operation of the selected one of said temperature changing means.

3. In control apparatus for flow controlling means for air conditioning apparatus, in combination, motor means for actuating said flow controlling means, first switch means, second switch means, and cam means operated by said motor means for actuating said first and second switch means, said cam means having a high, an intermediate and a low portion, said low portion extending substantially half the angular extent of said cam means, one of said switch means controlling the energization of said motor means in such manner that said motor means is normally stopped with both of said switch means being positioned by the high and intermediate portions of the cam means.

4. In an air conditioning system having temperature changing means including heating and cooling means and motor actuated means for placing either the heating or cooling means in operative relation in the system, means for controlling said system comprising, in combination, first switch means operated by said motor, second switch means operated by said motor, temperature responsive means, third switch means operated by said temperature responsive means on temperature fall, fourth switch means operated by said temperature responsive means on temperature rise, said third and fourth switch means each including a plurality of sets of sequentially operable contacts, and circuit means connecting said heating and cooling means, said motor means and said switch means so that the first set of contacts operated by said temperature responsive means, upon temperature change in either direction controls the operation of said motor means and initiates a holding circuit for one of said temperature changing means and the second set of contacts operated in sequence by said temperature responsive means causes energization of said temperature changing means and the completion of said holding circuit.

5. In an air conditioning system having plural stage temperature changing means and motor actuated means for placing said temperature changing means into or out of operative relation in said system, control means for each stage of the temperature changing means, each of said control means including switch means actuated thereby, temperature responsive means, switch means including a plurality of sequentially operated contacts operated by said temperature responsive means, and circuit means connecting said motor, said control means and the switch means actuated by said temperature responsive means in such manner that said control means are actuated in the same sequence as the sequentially operated switch means, the switch means operated by the control means permitting the said sequence and positively preventing any other sequence of operation.

6. In an air conditioning system having two types of treating means and means for placing one or the other of said treating means in operative relation in said system, said treating means including safety switch means, motor means for operating said placing means, first switch means operated by said motor means, second switch means, means responsive to a condition indicative of a need for operation of the system for operating said second switch means, and circuit means connecting said motor means, said first switch means, said safety switch means and said second switch means, said second switch means causing energization of one of said treating means and causing said motor to position said first switch means in a manner to permit subsequent operation of said motor means only upon a demand for operation of said other treating means.

7. In an air conditioning apparatus, in combination, air treating means, electrical regulating means for said treating means, safety means for said treating means, condition responsive means, switch means operated by said condition responsive means, said switch means comprising first and second sets of contacts, said sets of contacts being sequentially operable, and an electrical circuit for controlling said regulating means comprising in series said first set of contacts, said safety means, said second set of contacts and said regulating means.

8. In a cooling system, a plurality of compressors, a relay means for each compressor for controlling the operation of said compressor, each of said relay means including a winding and a plurality of sets of contacts, plural stage condition responsive control means, and means electrically connecting said relays and said condition responsive means so that the winding of at lease one relay can be energized only through said condition responsive control means and a set of contacts of another relay.

9. In an air conditioning system, heating means, cooling means, common boiler means for said heating means and said cooling means, means regulating the operation of said boiler means, diverting valve means for directing heated fluid to either the heating means or said cooling means, limit control means for said cooling means, limit control means for said boiler means, motor means for operating said valve means, switch means operated by said motor means, temperature responsive means for controlling said regulating means and said motor means, and means electrically connecting said regulating means, said boiler limit control means, said switch means, said limit control means for said cooling means and said temperature responsive means so that said boiler limit control means is effective for both heating and cooling operation and said limit control means for said cooling means is made effective by said switch means only when cooling is required.

10. In control apparatus for an air conditioning system having flow control means, in combination, motor means for actuating said flow control means, cam means operated by said motor means, said cam means including low, intermediate, and high cam surfaces, follower means for engaging said surfaces, and first, second and third switch means operated by said follower means in such manner that said first, second, and third switch means are operated in one manner when said follower means engages the high surface of said cam, the first and second switch means are operated in a reverse manner when said follower engages the intermediate surface of said cam, and said third switch means is operated in a reverse manner when said follower means engages the low surface of said cam.

11. In control apparatus for an air conditioning system having flow control means, in combination, electric motor means for actuating said flow control means, cam means operated by said motor means, said cam means including low, intermediate, and high surface portions, a pair of oppositely disposed follower means for engaging said surfaces, and first, second, and third switch means operated by each of said follower means, each of said first and third switch means being connected in current controlling relation to said motor means, each of said first, second, and third switch means being operated in one manner when the respective follower means engages the high cam surface portion, said first and second switch means being operated in a reverse manner when said follower means engages the intermediate cam surface portion, and said third switch means is operated in a reverse manner when said follower means engages said low surface portion.

12. In control apparatus for an air conditioning system, in combination, motor means, cam means operated by said motor means, said cam means having low, intermediate, and high cam surfaces, cam follower means engaging said cam surfaces, and first and second switch means operated by said follower means in such manner that said first and second switch means are operated to open one switch means and close the other when said follower is on the high surface of said cam and to operate both of said switch means in a reverse manner when said follower is on the intermediate surface of said cam.

ALWIN B. NEWTON.

REFERENCES CITED

The following references are of record in the file of this patent:

UNITED STATES PATENTS

| Number | Name | Date |
|---|---|---|
| 1,902,979 | Whiteley | Mar. 28, 1933 |
| 2,011,787 | Whiteley | Aug. 20, 1935 |
| 2,291,769 | Smellie | Aug. 4, 1942 |
| 2,352,930 | Anderson | July 4, 1944 |
| 2,364,459 | McGrath | Dec. 5, 1944 |
| 2,381,427 | Andersson | Aug. 7, 1945 |
| 2,403,798 | Holmes | July 9, 1946 |

Certificate of Correction

Patent No. 2,561,067                                              July 17, 1951

ALWIN B. NEWTON

It is hereby certified that error appears in the printed specification of the above numbered patent requiring correction as follows:

Column 6, line 26, for "respectve" read *respective*; line 73, for "estabilshed" read *established*; column 7, line 28, for "wire 153" read *wire 163*; column 14, line 27, for "tempearture" read *temperature*; column 19, line 31, for "lease" read *least*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*